June 24, 1930.  V. VASILEVSKY  1,767,723
FISHING TACKLE
Filed June 6, 1929
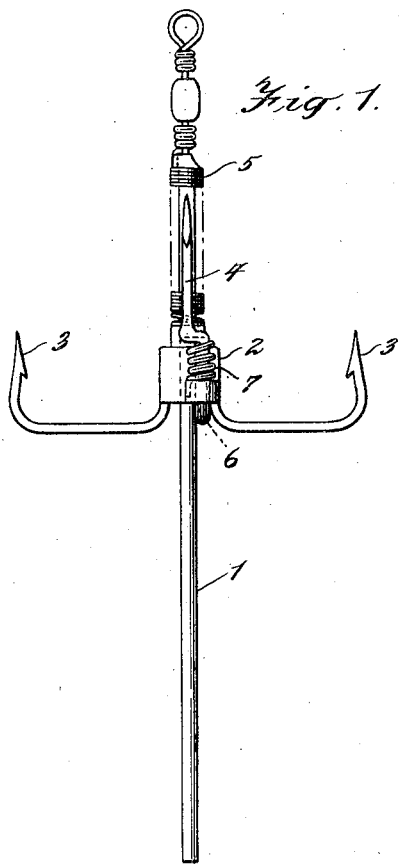
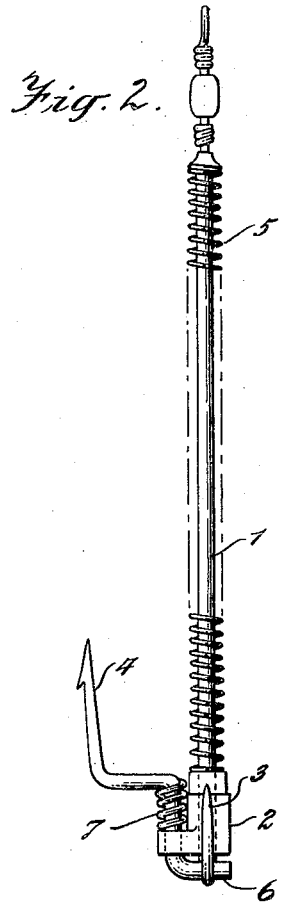
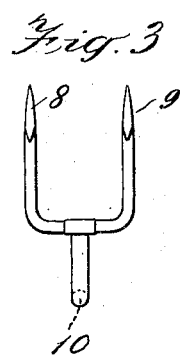
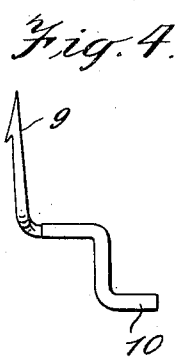
INVENTOR
Vsevolod Vasilevsky
BY
Victor A Borst
ATTORNEY Patented June 24, 1930

1,767,723

UNITED STATES PATENT OFFICE

VSEVOLOD VASILEVSKY, OF NEW YORK, N. Y., ASSIGNOR OF ONE-HALF TO GEORGE VASILEVSKY, OF NEW YORK, N. Y.

FISHING TACKLE

Application filed June 6, 1929. Serial No. 368,827.

Quite frequently, when fishing with an ordinary fish-hook, the fish secures the bait without being caught by the hook and in deep sea fishing, unless the hook is securely imbedded in the fish, it is able to free itself. In order to avoid these conditions, various types of fishing tackles have been devised some of which have impaling spears or hooks which are released by a trigger and resiliently urged in the direction of the bait. It is to a fishing tackle of this later type that my invention relates.

Fishing tackles having impaling hooks, heretofore, have been constructed with a single impaling hook which is resiliently urged toward a bait hook. The impaling hook is held in a retracted position by a trigger arrangement, the trigger releasing the impaling hook when the bait hook is disturbed. In some instances the impaling hook is also the bait hook. Fish of the deep sea variety attack bait from whatever direction they chance to come upon the bait, and invariably exert a pushing force upon the bait hook. Therefore, in fishing tackles having a single impaling hook, the fish, unless it attacks the bait from a position in front of the hook is very apt to spin the tackle and push the impaling and bait hooks away so that the impaling hook is released ineffectually.

In accordance with my invention, I have devised a fishing tackle which is designed to imbed an impaling hook into the fish irrespective of its direction of approach relative to the bait hook. I employ a plurality of impaling hooks and a bait hook having a trigger attachment which are slidably mounted upon a rod that is free to rotate. The impaling hooks are so arranged with respect to the bait hook that irrespective of the direction of approach of the fish the rod carrying the hooks will be rotated so that one of the impaling hooks will be brought under the fish and when released will be imbedded therein.

Among the characteristics of my invention is the fact that the trigger is resiliently urged to the operative position, thereby facilitating the setting of the tackle.

Specifically, I employ a rod which is adapted to be secured to one end of a string. Upon the rod is slidably mounted a bushing which carries a bait hook and two impaling hooks. The bushing is resiliently urged toward the top of the rod. The bait hook is rotatably mounted in the slidable bushing and has at its lower end a trigger which is adapted to engage the lower end of the rod to hold the bushing there with the spring expanded. The impaling hooks are rigidly secured to the bushing on opposite sides of the rod in a plane perpendicular to the plane of the bait hook. Thus, regardless of the direction from which the fish attacks the bait on the bait hook, the rod will spin around and one or the other of the impaling hooks will be brought under the fish.

The trigger on the end of the bait hook is desirably resiliently urged to the operative position so that as it is brought past the end of the rod it automatically assumes a position directly in line with the longitudinal axis of the rod, and so catches underneath the end of the rod.

My invention has other features and advantages and comprehends various other details of construction as will hereinafter more particularly appear.

I shall now describe the illustrated embodiments in connection with the accompanying drawings in which:

Fig. 1 is a front elevation of a fishing tackle embodying my invention, the impaling hooks being in a released position;

Fig. 2 is a side elevation of the fishing tackle shown in Figure 1, the impaling hooks being in the retracted position;

Fig. 3 is an elevation of a modified form of bait hook, and

Fig. 4 is a side elevation of the hook shown in Fig. 3.

In the embodiment of my invention illustrated in Figs. 1 and 2, there is shown a fishing tackle comprising a rod 1 on which a bushing 2 is slidably mounted. The bushing 2 carries two impaling hooks 3 rigidly secured thereto on opposite sides of the rod 1, lying in a plane containing the longitudinal axis of the rod. In a plane perpendicular to and intersecting the plane of the impaling hooks along the longitudinal axes of the rod 1, is a bait hook 4 which is so mounted in the bushing 2 as to be rotatable on an axis parallel to that of the rod. A coil spring 5 surrounds the rod 1 and is secured at one end to the upper end of the rod 1 and at the other end to the bushing 2 and resiliently urges the bushing towards the upper end of the rod, i. e., the end toward which the points of the hooks are directed.

On the lower end of the bait hook 4, there is an angular extension 6 which is adapted to engage underneath the end of the rod 1 to hold the spring 5 under tension. A torsional spring 7 resiliently urges the extension 6 in alignment with the longitudinal axis of the rod 1 so that as the lower end of the bushing 2 is drawn past the end of the rod 1, the extension 6 becomes automatically aligned with the axis of the rod 1, and as the bushing is released, the extension 6 engages the rod and holds the tackle set with the spring 5 under tension.

The device is adapted to be used with a line which is secured to the upper end of the rod 1. The bait is placed upon the bait hook 4 and the lower end of the bushing drawn down past the end of the rod so that the projection 6 engages the end of the rod. A fish in attacking the bait will proceed head on, pushing the bait hook and turning the rod. The impact of the fish against the bait hook releases the projection 6 on the end of the bait hook from engagement with the end of the rod 1. The spring 5 will then snap the bushing 2, carrying the bait hooks and impaling hooks upward, and one or the other of the impaling hooks is certain to be under the fish and will be imbedded in it.

In Fig. 4 I have illustrated a modified form of bait hook. This modified form of bait hook, which is especially adapted to be used when clams are used for bait, comprises two hooks 8 and 9 arranged side by side like the tines of a two-tined fork, and shown as constituting the legs of a U-shape member. Their cross connector is attached to the rod which serves as the swivel in the bushing and which has its lower end angularly bent to form the trigger element 10 similar to the corresponding element 6 in the form previously described. The clam can be placed over the two hooks 8 and 9, and upon striking either hook the projection 6 will be released from the lower end of the rod 1, the impaling hooks being snapped upwardly by the spring 5 to be imbedded in the fish.

It is obvious that various changes may be made in the constructions shown in the drawings and above particularly described within the principle and scope of my invention as expressed in the appended claims.

I claim:

1. A fishing device comprising a bushing slidably mounted upon a rod, two impaling hooks on opposite sides of said rod rigidly mounted in said bushing, a bait hook movably mounted in said bushing between said impaling hooks, resilient means urging said bushing toward one end of said rod, and means coupled to said bait hook for releasably holding said resilient means under tension.

2. A fishing device comprising a bushing slidably mounted upon a rod, resilient means for urging said bushing toward one end of said rod, two impaling hooks rigidly secured to said bushing on opposite sides of said rod, a bait hook movably mounted in said bushing between said impaling hooks, a lateral extension on said bait hook adapted to engage the end of the rod to hold said resilient means under tension, and means for urging said extension in alignment with the longitudinal axis of said rod.

3. A fishing device comprising a bushing slidably mounted upon a rod, resilient means for urging said bushing toward one end of said rod, two impaling hooks rigidly secured to said bushing on opposite sides of said rod in a plane containing the longitudinal axis of said rod, a bait hook movably mounted in said bushing in a plane perpendicular to and intersecting the plane of said impaling hooks along the longitudinal axis of the rod, a lateral extension on said bait hook adapted to engage the end of said rod to hold said resilient means under tension, and resilient means for urging said extension in alignment with the longitudinal axis of said rod.

In witness whereof, I hereunto subscribe my signature.

VSEVOLOD VASILEVSKY.